Patented Oct. 31, 1922.

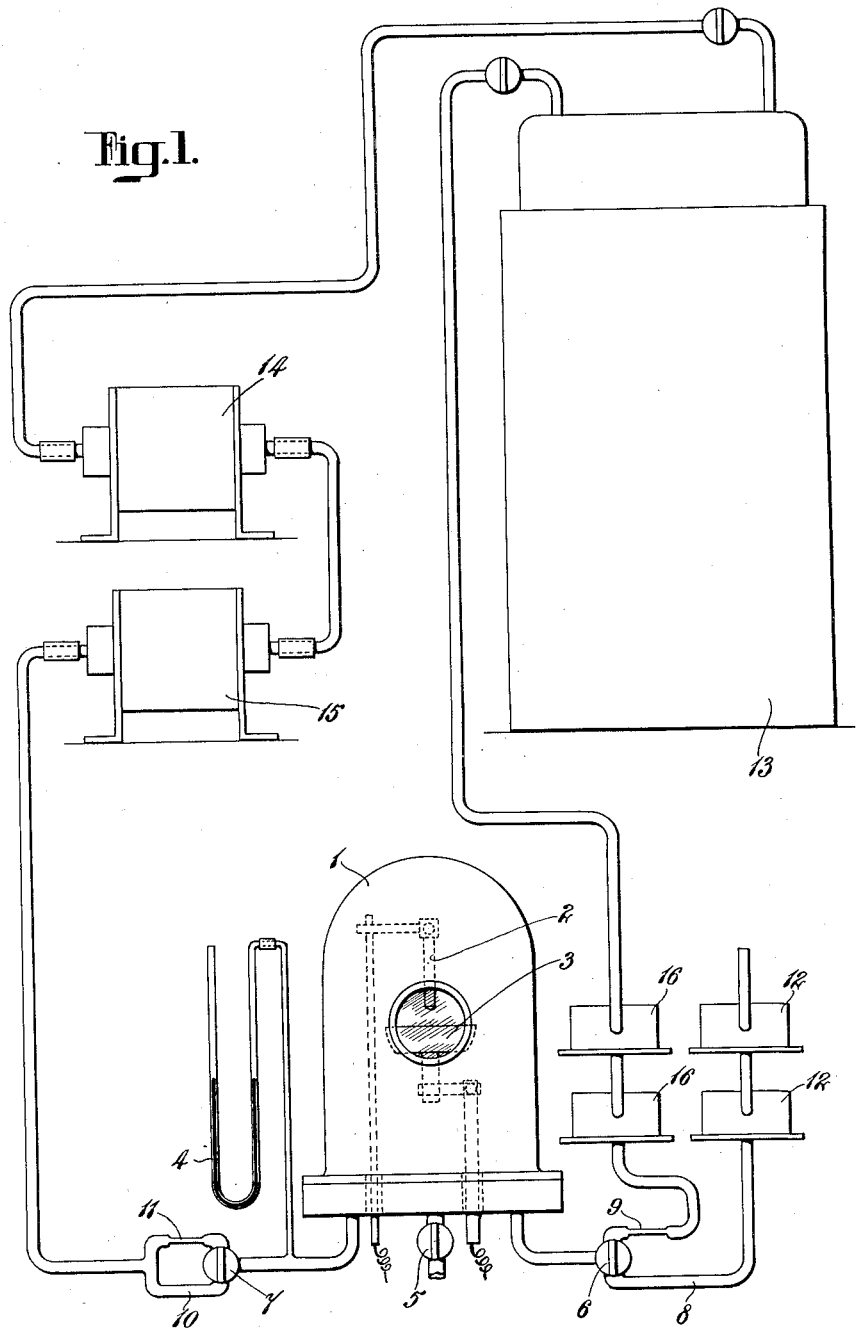

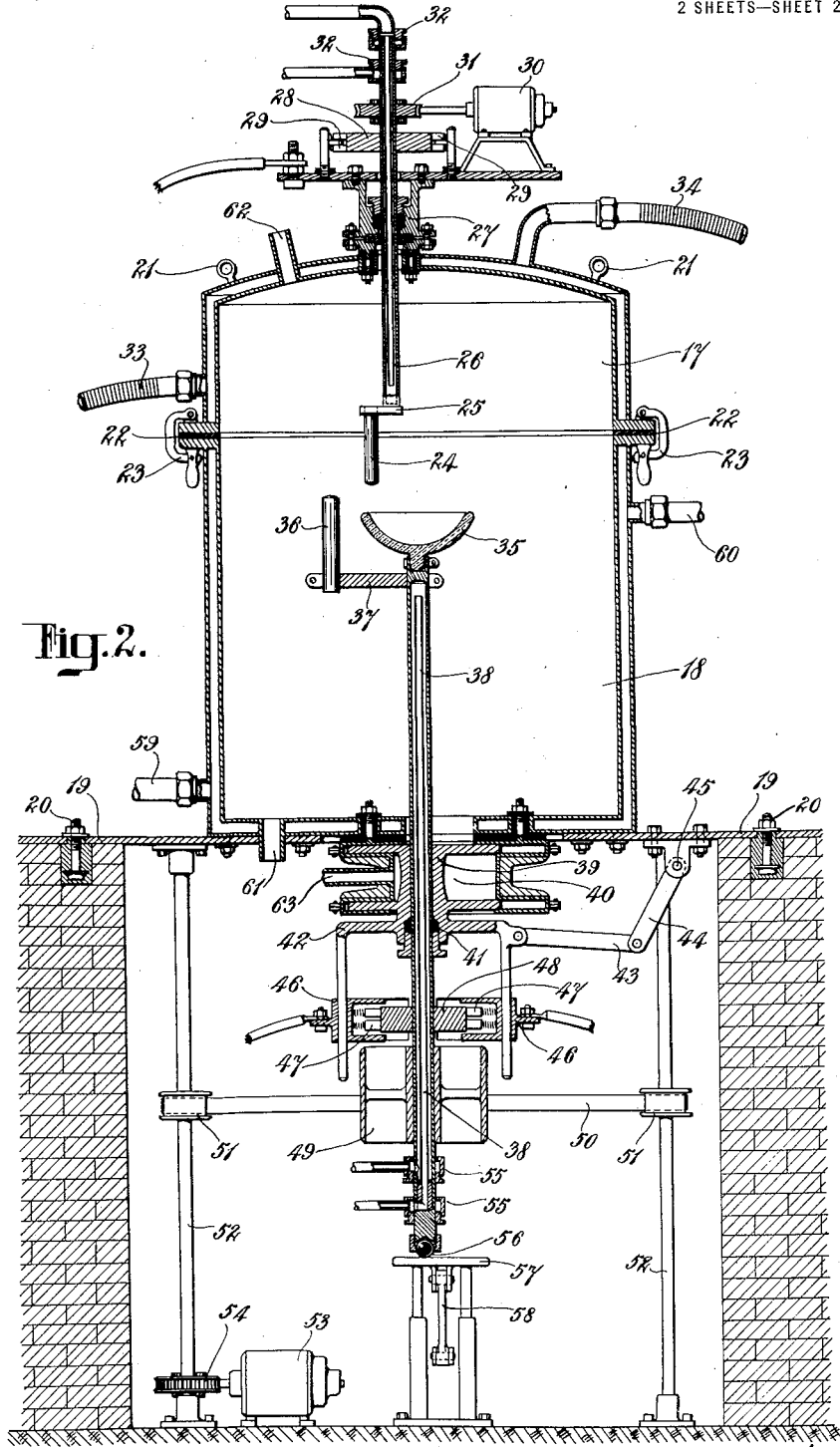

1,433,541

UNITED STATES PATENT OFFICE.

PAUL FREEDMAN, OF LONDON, AND ERNEST GREETHAM, OF HULL, ENGLAND.

METHOD OF EXTRACTION OF METALS FROM THEIR COMPOUNDS.

Application filed April 10, 1922. Serial No. 551,409.

*To all whom it may concern:*

Be it known that we, PAUL FREEDMAN, a Russian citizen, and ERNEST GREETHAM, a subject of the King of Great Britain and Ireland, residing at London, England, and Hull, England, have invented certain new and useful Improvements in Methods of Extraction of Metals from Their Compounds, of which the following is a specification:

The present invention relates to methods of extracting metals from their compounds.

The method is applicable to most metals but is especially suitable for extraction of certain rare metals such as zirconium, cerium or uranium from their compounds such as oxides, nitrides, nitrates, etc.

The extraction of metals from their compounds is effected by reduction of the compounds in a direct current arc furnace of special construction in an atmosphere of suitable gas or gases.

The metallic compound to be reduced to metal is compressed into blocks of suitable proportions and is then ready for treatment in the arc furnace. No binding material or reducing agents are mixed with the material thus compressed.

The furnace in which the reduction takes place is of direct current arc type possessing an anode in the form of a crucible and a cathode in the form of a rod or block of suitable proportions. In the case of a large unit the furnace has also an auxiliary anode in the form of a rod or block of suitable proportions placed in the vicinity of the anode crucible. The electrodes are composed of refractory conducting material such as tungsten which may have mixed with it a certain percentage of refractory non-conducting material.

The furnace is constructed so that it may be exhausted to a high degree of vacuum and then filled with a gas or gases at a suitable pressure. To obtain these conditions the furnace is constructed in two parts, the lower portion being fixed and the upper being a removable bell jar, both being made of non-porous material.

The type of the furnace and the nature of the process used may be best explained with the aid of the appended drawings.

Fig. 1 gives a diagrammatic view of the entire apparatus.

The bell jar portion of the furnace chamber 1 is removed and the compound block about to be reduced placed in the anode crucible 3. The bell jar portion of the furnace chamber 1 is then replaced, tap 5 closed and with tap 7 closed, the furnace is exhausted through tap 6 and limb 8 by means of pumps 12, 12. When the desired degree of vacuum is recorded by the gauge 4, tap 6 is closed and tap 7 opened to limb 10. The requisite amount of gas is admitted from the holder 13 through furnaces 14 and 15 into the arc furnace chamber 1. The gas or gases employed must be such as cannot contaminate the reduced metal in the anode crucible 3.

Hence in extraction of such active metals as zirconium or uranium which combine readily with common gases, the rare gases argon or helium must be used. In view of the present scarcity of helium, argon is the most suitable gas. The taps 6 and 7 are now opened to limbs 9 and 11 respectively and the gas circulated through the whole system, being drawn out of the arc furnace chamber 1 through circulating pumps 16, 16 into the holders 13 and passing out of that through furnaces 14 and 15 back into arc furnace chamber.

The pressure in the furnace chamber remains constant, the out-flow of the gas being equal to the in-flow.

An arc is now formed between the cathode 2 and the anode crucible 3, or, in the case of a larger unit between the cathode and an auxiliary anode placed in the vicinity of the anode crucible 3.

The arc is drawn over the compound block which is heated until it is rendered conductive. The arc is now shifted on to the compound block which thus becomes an anode.

The compound block splits up under the action of the arc, the reduced metal being left in the anode crucible 3, the volatile impurities being removed by distillation and the gaseous constituents passing off into the arc furnace chamber atmosphere and being duly drawn off by the circulating pumps 16, 16. If the compound under reduction liberates oxygen, the inert gas passing from the holder 13 into the arc furnace chamber 1 is freed from oxygen by passing over some suitable substance, in furnace 14, such as red hot copper.

If the inert gas passing from holder 13 into the arc furnace chamber 1 must be also freed from nitrogen, as in the case of the reduction of uranium compounds in an argon atmosphere, nitrogen is removed from the gas entering the arc furnace chamber 1 by passing the gas over some suitable substance placed in furnace 15, such as red hot calcium. When the process of reduction of the compound block is complete, the arc is switched off, tap 7 closed, and the remaining gases in the arc furnace chamber 1 pumped out by pumps 16, 16 into the holder 13.

The tap 6 is now closed, the tap 5 opened to air, the bell jar portion of the furnace raised and the reduced metal removed from the anode crucible 3.

Instead of a single inert gas being used in the furnace chamber 1, a mixture of gases may be used.

For the best results it may be advantageous to remelt the reduced metal several times in the anode crucible 3.

The arc furnace for the process may be constructed so as to be suitable for small or large scale production.

Fig. 2 in the appended drawings shows a large unit furnace. The furnace chamber is constructed in two halves, both of metal, the upper portion 17 being removable, and the lower portion 18 being bolted on to the steel base plate 19, which is fixed on the supporting brickwork by means of bolts 20, 20.

The upper portion of the furnace chamber is provided with rings 21, 21, welded on to it, by means of which it can be hauled up or lowered by steel ropes not shown in the drawing.

The two halves of the furnace chamber may be pressed tightly together, with the aid of the rubber or leather ring 22 and clamps 23, 23 so as to make a vacuum tight joint when the furnace is exhausted.

The upper portion of the furnace chamber 17 is provided at the top with a packing gland 27, through which passes an oil cooled electrode shaft 26, carrying a right angle steel arm 25 into which the cathode 24 is fixed.

The packing gland 27 is electrically insulated from the upper half of the furnace chamber 17.

Current is led out of the electrode shaft 26, through the slip ring 28 by brushes 29, 29. The electrode shaft is rotated by an electric motor 30 geared to it by gear 31, and bolted to the top of the upper portion of the furnace chamber 17, as shown in the drawing. The oil cooling, the electrode shaft 26 is fed in and out of the shaft through ring joints 32, 32. The upper portion of the furnace chamber 17 is double walled and water cooled, water entering the water jacket by pipe 33, and leaving it by pipe 34. The lower half of the furnace chamber 18 contains the anode crucible 35, and the auxiliary anode 36 fixed on a steel right angle arm 37, both the anode crucible and the auxiliary anode 36 being attached to the oil cooled electrode shaft 38.

The oil cooled electrode shaft 38 passes through the cross head 39, which moves in a vacuum tight cross head chamber 40; packing gland 41 is fixed on the cross head. The cross head chamber 40 is electrically insulated from the lower portion of the furnace chamber 18.

Attached to the packing gland 41 and cross head 39 is a casting 42 joined by a link 43 to crank 44 which is operated by turning the shaft 45 by means of a lever not shown in the drawing.

The casting 42 has two guides upon which slide the brush carrier 46, 46 carrying the brushes 47, 47 which lead the current into the electrode shaft 38 through the slip ring 48.

The electrode shaft 38 is driven by means of a pulley 49, bolted on to it, and a belt 50 passing over pulleys 51, 51, and a third pulley not shown in the drawing.

The pulleys 51, 51 are fixed on shafts 52, 52 and one of these is driven by an electric motor 53 through gearing 54.

The oil cooling electrode shaft 38 is fed into and out of it by means of ring joints 55, 55.

Fixed in the lower end of the electrode shaft 38 is a steel ball 56 which rests on a table 57, operated by link 58, which is actuated by a lever not shown in the drawing.

The lower half of the furnace chamber 18 is double walled and water cooled, water entering the water jacket by inlet pipe 59 and leaving it by outlet pipe 60.

In the bottom of the lower half of the furnace chamber 18 and in the top of the upper half of furnace chamber 17 there are pipes 61 and 62 respectively, the former serving for air inlet and exhaust, and the upper for inlet of gas.

In order to obviate the chance of air leakage into the furnace through the cross head chamber 40, the latter is exhausted by a separate pump through tube 63. The furnace is provided with an observation window of silica or hard glass let in the lower half of the furnace chamber 18. The window is not shown in the drawing. The furnace interior may be conveniently illuminated by a lamp, not shown in the drawing, fixed at the bottom of the lower half of the furnace chamber 18.

The method of operating the furnace is as follows:—

When the compound block has been placed in the anode crucible 35, the furnace exhausted, filled with gas at a suitable pressure and the gas circulation started, the cross head 39 is drawn to the right by turning shaft 45 so that the auxiliary anode 36 is vertically below the cathode 24. By means of the moving table 57 the electrode shaft 38 is now raised so that auxiliary anode 36 and cathode 24 are brought in contact.

The current is switched on and the table 57 lowered, the auxiliary anode 36 and cathode 24 being thus separated and an arc formed between them. The cross head 39 is now moved to the left so that the arc between electrodes 36 and 24 passes over and heats the compound block in the anode crucible 35. When the compound block is sufficiently heated the arc between the auxiliary anode 36 and cathode 24, is switched off. The anode crucible is raised by actuating the table 57, so that the compound block in the anode crucible 35 and the cathode 24 are brought into contact. The current is now switched on, the anode crucible 35 lowered by actuating the table 57, and an arc formed between the compound block in the anode crucible 35 and the cathode 24.

The motors 30 and 53 are now switched on and the electrode shafts 26 and 28 brought into rotation. The lower end of the cathode 24 describes a circle whose diameter is a radius of the circle formed by the inner edge of the crucible 35.

The whole of the compound block is thus brought under the action of the arc and reduced to metal.

A furnace of the type described above is capable of dealing efficiently with rare metals in large quantities.

As already described the furnace electrodes are composed of refractory conducting material such as tungsten, which may have mixed with it a certain percentage of refractory non-conducting material. In the case of extraction of rare refractory metals such as zirconium, it is best to use an anode crucible composed of pure fused tungsten and a cathode and an auxiliary anode composed of tungsten mixed with refractory non-conducting materials. Carbon or molybdenum electrodes may however, be conveniently used in certain cases.

What I claim and desire to secure by Letters Patent in United States of America is:—

1. A method of extracting metals from their compounds by fusing and reducing the said compounds in a D. C. arc furnace in an atmosphere of inert gas or gases such as argon or helium.

2. A method of extracting metals from their compounds by fusing and reducing the said compounds in a D. C. arc furnace in an atmosphere of inert gas or gases such as argon or helium, the metallic compounds being reduced in a refractory conducting crucible which is the anode electrode of the arc furnace.

3. A method of extracting metals from their compounds by fusing and reducing the said compounds in a D. C. arc furnace in an atmosphere of inert gas or gases such as argon or helium, the metallic compounds being reduced in a refractory conducting crucible which is the anode electrode of the arc furnace, the said metallic compounds being rendered conductive by being heated in an arc formed either between the wall of the anode crucible and the cathode or between an auxiliary anode, placed in the vicinity of the anode crucible, and the cathode.

4. The method of extracting metals from their compounds by fusing and reducing the said compounds in a direct current arc furnace in an atmosphere of inert gas or gases such as argon or helium, and removing the active gaseous impurities from the body of the inert gas or gases during such fusing and reducing of said compound.

Signed at London in the county of London, England this 31st day of March 1922.

PAUL FREEDMAN.
ERNEST GREETHAM.